Patented Oct. 27, 1925.

1,558,599

UNITED STATES PATENT OFFICE.

GUSTAVUS J. ESSELEN, JR., OF SWAMPSCOTT, MASSACHUSETTS, ASSIGNOR TO BADGER FIRE EXTINGUISHER COMPANY, OF BOSTON, MASSACHUSETTS, A CORPORATION OF MASSACHUSETTS.

FOAM-STABILIZING COMPOSITION.

No Drawing.   Application filed April 22, 1924.   Serial No. 708,188.

*To all whom it may concern:*

Be it known that I, GUSTAVUS J. ESSELEN, Jr., a citizen of the United States, residing at Swampscott, in the county of Essex and State of Massachusetts, have invented new and useful Improvements in Foam-Stabilizing Composition, of which the following is a specification.

The present invention relates to compositions which when mixed with water or other suitable liquid will produce a stable and lasting foam, capable of extinguishing fire when thrown upon burning substances; and capable also of guarding against ignition of inflammable liquids by providing an incombustible floating layer on confined bodies of such liquids; and still further, being effective in the same manner of use to prevent evaporation of volatile liquids. The main object and purpose of the invention is to provide a composition which, when dissolved in a liquid, and the liquid is afterwards converted into a foam, will cause the foam to be more lasting, and otherwise of better character for the purposes above noted than has been attained heretofore. A further important result sought and obtained by this invention is to utilize as ingredients of the composition, substances which can be obtained in the required quantities at low cost, to the end that the composition can be sold to consumers at moderate prices.

The new step in the art made by this invention consists principally in the use or application of the substances hereinafter named, or either of them, for stabilizing foam, however produced. The invention also includes the combination between the foam stabilizing ingredients and reagents which will generate a gas when mixed together in solution, and thereby produce foam in the solvent liquid.

In now more exactly defining the characteristics of my invention I will first describe the preferred ingredients and their proportional content, and distribution, in and between the reagents which I prefer to use in portable hand fire extinguishers; and will then indicate the further utility and wider scope of the invention.

In applying the invention to the case of a portable fire extinguisher, and using as the gas generating reagents aluminum sulfate and sodium salts of carbonic acid, I prefer to make use of the following ingredients in approximately the proportions indicated beside the name of each ingredient, separated in two solutions.

Solution No. 1. Aluminum sulfate 1 to 3 pounds, water 2 to 4 pints.

Solution No. 2. Sodium bicarbonate 21 ounces, sodium carbonate (anhydrous) 2.75 ounces, evaporated sulfite waste 20 ounces, sodium resinate (50% water) 0.5 ounce, water 2.25 gallons.

The substance above designated as evaporated sulfite waste is the dry residue obtained by taking the waste liquor resulting from the sulfite process of wood pulp manufacture, neutralizing this liquor with lime, and evaporating the neutralized liquor to dryness. This product is an article of commerce obtainable in the open market at low cost. Whenever in this specification I make reference to sulfite waste, it is to be understood that I mean the product just described, the same being a substantially dry solid of neutral reaction.

The sodium resinate ingredient of solution No. 2 is made by combining rosin with caustic soda. A suitable method of making it is to take eighty parts by weight of rosin, warm the rosin gently until it becomes liquid, and then add to the liquid rosin, slowly and with constant stirring, ten and one-quarter parts by weight of caustic soda (approximately 94% purity) which has been dissolved in eighty-nine parts by weight of water. The mixture is kept warm throughout the time while the caustic soda solution is being added and must be stirred thoroughly. The term "sodium resinate" as used in this specification means a compound of rosin and soda substantially like that just described, although it may be made in other proportions and by other methods.

In preparing a charge of the No. 2 solution for use in a fire extinguisher, the content of sodium resinate (one-half ounce) is dissolved in four ounces of a two per cent caustic soda solution, which is warmed sufficiently to dissolve the sodium resinate. Enough of the sulfite waste (about two or three ounces) is then stirred into the solution to form a paste. The entire content of sodium bicarbonate and sodium carbonate, with the balance of sulfite waste (seventeen or eighteen ounces) are then thoroughly mixed together and dissolved in two and one-quarter gallons of warm water. When completely dissolved this solution is stirred slowly, a little at a time, into the paste containing the sodium resinate and sulfite waste solution previously prepared. As soon as the mixture has cooled it is ready for use in the fire extinguisher. This mixture is the solution which forms the main body of the extinguisher charge, the first solution being that which contains the complemental reagent necessary to generate carbonic acid gas.

In solution No. 2 the ingredients, consisting of sodium resinate and sulfite waste, are the substances which act to stabilize the foam produced by evolution of gas. They also cause the bubbles of the foam to be much finer and of more uniform size than are produced by a mixture of water solutions containing the gas generating reagents alone. In producing this effect the sodium resinate has a very important influence. Its use greatly improves the foam over what can be obtained by the use of sulfite waste alone as a stabilizer. It will be noted that not only is the sodium resinate ingredient intrinsically cheap, but its content in the entire composition is very small, little more than one percent of the solid ingredients, wherefore its cost is negligible.

The sulfite waste and sodium resinate may be mixed and put out in paste or powder form as an article of commerce to be used in any suitable way for the purposes herein set forth.

I have found further that the resinates of the other alkalies, potassium and ammonium, when used as herein described, are effective to obtain results similar to those described. Potassium resinate is obtained by combining rosin with caustic potash in substantially the same way as described for combining rosin with caustic soda; and ammonium resinate is obtained by mixing ammonia and rosin in a similar manner. Hence I do not limit my invention to sodium resinate as one of the foam stabilizing ingredients, but include the other alkali-metal resinates as well; ammonium being considered as within the scope of the term "alkali metal". The term alkali-metal resinate used in the appended claims therefore, includes not only sodium resinate, but all other compounds of a rosin with an alkali-metal, in any proportions which are effective to secure the results indicated.

It is to be understood that the proportions which I have given are illustrative merely, and are not intended to limit the protection which I claim, for very good results are obtainable with wide variations in the ratios of the foam stabilizing ingredients to the gas generating reagents and to the quantity of liquid used. It is also to be understood that I do not limit my protection to the combination of the foam stabilizing substances with the particular gas generating reagents here specified, or indeed, with any gas generating substances whatever; but that I desire to protect the same in connection with any other means for churning the solution into a froth, whether through chemical action or mechanical action.

Water or other liquid containing my improved foam stabilizer and converted into a foam by the chemical or mechanical action, may be thrown upon a fire in any location, and will effectually smother the flames. For instance if the fire is in the wall of a building the foam thrown upon it will remain for a long enough time to put out the fire, instead of immediately running off as water does and allowing the fire to break out again immediately. It is effective also to extinguish burning oil, or oil derivatives, such as gasoline, etc., which are of less specific gravity than water, for it will float on the surface of the oil; and its great stability allows it to be applied as a blanket on the surface of volatile liquids to prevent evaporation of such liquids.

What I claim and desire to secure by Letters Patent is:

1. A foam stabilizing composition consisting of evaporated neutralized sulfite waste liquor, and an alkali-metal resinate.

2. A foam stabilizing composition consisting of evaporated neutralized sulfite waste liquor, and an alkali-metal resinate, in proportions by weight of one part of the resinate to from six to seventy parts sulfite waste.

3. A foam producing fire extinguisher charge which consists of a soluble salt of carbonic acid in solution mixed with a solution containing evaporated neutralized sulfite waste and an alkali-metal resinate.

4. A foam-forming fire extinguisher charge comprising a liquid containing in dispersion the residue of neutralized and evaporated sulfite waste liquor.

5. A foam fire extinguisher charge consisting of two solutions respectively containing complemental reagents which, when mixed in liquid phase, cause generation of gas; and one of said solutions containing in dissolved condition evaporated neutralized sulfite waste.

6. A foam fire extinguisher charge consisting of two separated solutions containing respectively reagents which, when mixed in liquid phase cause generation of gas and one of said solutions containing also in dissolved condition an alkali-metal resinate and evaporated neutralized sulfite waste as a foam stabilizer.

7. A fire extinguisher charge adapted to produce a foam which consists of two separated solutions, one of them containing a salt of aluminum, and the other containing a salt of carbonic acid, and said salts when mixed in liquid phase being capable of generating gas, and one of said solutions containing in dissolved condition an alkali-metal resinate and evaporated neutralized sulfite waste as a means for stabilizing the foam produced by the mixing of said solutions.

In testimony whereof I have affixed my signature.

GUSTAVUS J. ESSELEN, Jr.